(12) United States Patent
Mudalegundi

(10) Patent No.: US 8,774,029 B1
(45) Date of Patent: Jul. 8, 2014

(54) WEB APPLICATION SERVER CONFIGURATION DEPLOYMENT FRAMEWORK

(75) Inventor: Vijayanarayana Gopal Mudalegundi, Cummings, GA (US)

(73) Assignee: Cellco Partnership, Basking Ridge, NJ (US)

(*) Notice: Subject to any disclaimer, the term of this patent is extended or adjusted under 35 U.S.C. 154(b) by 490 days.

(21) Appl. No.: 13/117,432

(22) Filed: May 27, 2011

(51) Int. Cl.
*H04L 12/28* (2006.01)
*H04J 1/16* (2006.01)

(52) U.S. Cl.
USPC .......................................... 370/252; 370/386

(58) Field of Classification Search
USPC ................................................ 370/252, 386
See application file for complete search history.

(56) References Cited

U.S. PATENT DOCUMENTS

| 2003/0135663 A1* | 7/2003 | Duncan et al. | 709/321 |
| 2006/0136490 A1* | 6/2006 | Aggarwal et al. | 707/103 R |
| 2010/0281147 A1* | 11/2010 | O'Leary et al. | 709/222 |
| 2010/0333092 A1* | 12/2010 | Stefansson et al. | 718/100 |

* cited by examiner

*Primary Examiner* — John Pezzlo

(57) ABSTRACT

The method and article for dynamically generating, reinstalling, replicating, or reconfiguring a framework on an application server is presented. A list of configuration files is identified. A server administrator identifies, and a routine receives, a selection of the configuration files to be generated on the application server. The routine generates a temporary configuration file based on the selection. The server administrator configures one or more settings of the temporary configuration file, and the routine generates, on the computer of the application server, an actual configuration file using the temporary configuration file and the setting.

22 Claims, 9 Drawing Sheets

WEB APPLICATION SERVER CONFIGURATION DEPLOYMENT FRAMEWORK

TECHNICAL FIELD

The present subject matter relates to techniques and equipment to automate the process of creating, modifying, or migrating multiple or singular server environments.

BACKGROUND

Many different enterprises run complex networks of servers to implement various automated communication functions to the enterprise. For example, as mobile wireless communications have become increasingly popular, carriers such as Verizon Wireless™ have customer communication systems to provide notifications of account related activities to their customers, for example as SMS messages to account holders' mobile stations, as emails, etc. Because of the large number of customers served by a major carrier, and the level of account activities, the volume of notification message traffic is quite large. To effectively provide such notifications, Verizon Wireless™ implemented its Customer Communication Enterprise Services (CCES) as an enterprise middleware web service.

At a high level, the CCES middleware comprises a web server layer and an application server layer. The architecture allows clients to send a request, for example for a notification, to a web server. The http web server then forwards the client request to one of a number of application servers. Each application server has multiple applications running on it. The application server determines the proper application to process the client request based on the context root of the client request. The application server processes the client request, in the CCES example, by sending one or more request messages to a back end system such as the Vision Billing System, MTAS, the SMS gateway and others, for example, to implement account activity and to initiate subsequent automatic notification thereof to the account holder. Once the application server has processed the request, a reply is then sent back to the web server which will then forward the reply back to the client.

As the number of applications provided to customers and the number of customers increase more application servers are needed to handle the incoming requests. Further, along with creating new application servers, whole groups of application servers may be migrated to another geographically-distant data center based on facility requirements. In order to create a new WebSphere Application Server (WAS), IBM HTTP Server (IHS), or Application Server, an application server administrator currently has to login to the particular server and generate each property manually.

The generation of the server properties is time consuming. Some of the properties include server instances, clusters, datasources, and calls to the web server. Currently, each property must be generated by the server administrator for each application server. This time consuming task for one application server becomes a tedious and difficult task when creating a cluster of servers which need identical settings. The creation of server properties can take 4-5 hours, even using experienced server administrators. Currently, none of the venders who provide application server software have an application for an automated process to create or configure application servers. This application is also not provided by third parties.

One attempt at a solution to the above problem uses one-time scripts. For this solution, a server administrator creates a program to set a server property. These scripts are made-to-order, in that they are written for the particular application server at hand and are not usable for other application servers. In addition, this holds true for scripts to update server properties.

Hence a need exists for in the dynamic creation of application server objects and the ability to copy application server settings onto another application server quickly and efficiently.

SUMMARY

The teachings herein alleviate one or more of the above noted problems with creating and updating property files for application servers.

As a result, a method for dynamically generating a framework on an application server, includes creating a list of a plurality of configuration files, a server administrator identifies, and the routine receives, a selection of the plurality of configuration files to be generated on the application server. On a computer of the application server, a routine generates a temporary configuration file based on the selection. The server administrator configures, and the routine receives, one or more settings of the temporary configuration file, and the routine generates, on the computer of the application server, an actual configuration file using the temporary configuration file and the setting.

In an example, the creating step creates the list in a master property generation file. Further, the temporary configuration file is a temporary properties file and the actual configuration file is an actual properties file. Additionally, a Jython script can be used to generate the temporary configuration file. Also, the application server can be a Websphere Application Server (WAS).

An article of manufacture, includes at least one machine readable storage medium; and programming instructions embodied in the medium for execution by one or more computers. The programming configures the computers to be capable of performing functions for dynamic framework generation in a web application server environment. The functions are creating a list of a plurality of configuration files and receiving a selection of the plurality of configuration files to be generated on the application server. A temporary configuration file can be generated based on the selection and at least one setting of the temporary configuration file can be configured and received. To complete the process, on the computer of the application server, an actual configuration file is generated using the temporary configuration file and the setting.

In an example, the list above is created in a master property generation file. Further, the temporary configuration file is a temporary properties file and the actual configuration file is an actual properties file. A Jython script can be used to generate the temporary configuration file. Furthermore, the application server can be a Websphere Application Server (WAS).

A method for dynamically reinstalling, replicating, or reconfiguring a framework on an application server has the steps of selecting a configuration file to at least one of reinstall, replicate, and reconfigure on the application server. It is then determined if a temporary configuration file exists that is related to the selected configuration file. The temporary configuration file includes at least one setting. On a computer of the application server, if the temporary configuration file exists, an actual configuration file is generated using the temporary configuration file and the setting. If the temporary configuration file does not exist, the computer returns a message.

Additionally, the temporary configuration file can be generated on a second application server. The generation the actual configuration file step is performed using a Jython script. Also, the application server is a Websphere Application Server (WAS).

In another example of an article of manufacture, it includes at least one machine readable storage medium and programming instructions embodied in the medium for execution by one or more computers. The programming configures the computers to be capable of performing functions for dynamic reinstalling, replicating, and reconfiguring in a web application server environment. The functions performed are selecting a configuration file to at least one of reinstall, replicate, and reconfigure the file on the application server. A determination can be made to see if a temporary configuration file exists that is related to the selected configuration file. The temporary configuration file includes a setting. If the temporary configuration file exists, an actual configuration file is generated using the temporary configuration file and the setting. If the temporary configuration file does not exist, returning a message.

In further examples, the programming also generates the temporary configuration file on a second application server. A Jython script generates the actual configuration file and the application server is a Websphere Application Server (WAS).

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The exemplary solution automates the process of creating all of the necessary server objects for each application server and providing the function to copy the same objects to a different application server. For application servers this process is now simplified and streamlined.

The solution may be applied in the context of an enterprise middleware web service system. Although a dynamic framework generator may be implemented in web service systems for other applications, one example of such a system is the Communication Enterprise Services (CCES) enterprise middleware web service for a mobile carrier's communication network of the type outlined earlier. To facilitate an understanding of such an application of dynamic framework generation technology, it may be helpful to first consider the network and CCES middleware web service in somewhat more detail.

Figure 1:
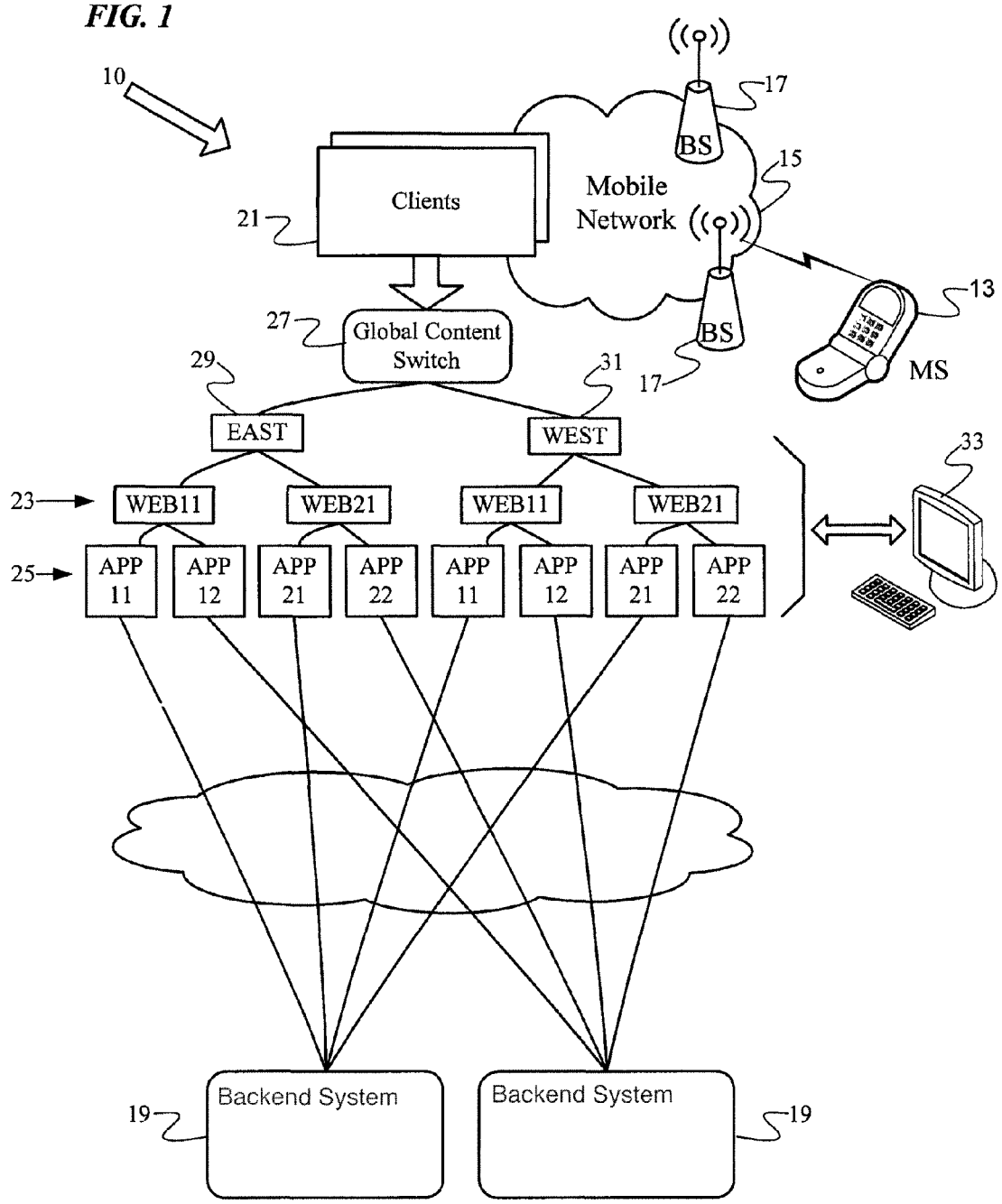
FIG. 1 is a high-level functional block diagram of a mobile carrier network and associated equipment for Customer Communication Enterprise Services (CCES), which may implement a dynamic framework generator.

FIG. 1 illustrates a system 10 offering a variety of mobile communication services to users of any number of mobile stations. The example shows simply one mobile station (MS) 13 as well as general cloud representation of a mobile communication network 15. The network 15 provides mobile wireless communications services to any number of mobile stations 13, for example, via a number of base stations (BSs) 17. The network 15 generally may be any of a variety of available mobile networks, and the drawing shows only a very simplified example of a few elements of the network for purposes of discussion here. The network 15 allows users of the mobile stations such as 13 to initiate and receive telephone calls to each other as well as through the public switched telephone network or "PSTN" (not shown) and telephone stations connected to the PSTN. The network 15 typically offers a variety of other data services via the Internet, such as downloads, web browsing, email, etc.

The system 10 also includes a number of systems operated by the carrier in support of its network services as well as platforms for Customer Communication Enterprise Services (CCES), implemented as an enterprise middleware web service, for example, to provide various messages to account holders or other mobile station users.

For example, the carrier will also operate a number of systems that provide ancillary functions in support of the communications services provided through the network 10, and those elements communicate with other nodes/elements of the network 10 via one or more private IP type packet data networks (sometimes referred to as an Intranet—not shown). The support elements, for example, include one or more systems of record, such as a Vision Billing System, which includes subscriber account records. In the context of the CCES functions implemented via the web service, the system 19 is a backend system. Backend systems of the CCES service may include Vision, MTAS, SMS gateway and others. The backend systems shown at 19, for example, implement account activity and/or provide automatic notification thereof to the account holder.

At a high level, the web site may be considered as one of the clients 31 of the CCES web service. CCES services are implemented using instances of the IBM WebSphere Application Server (WAS). Websphere is a software product for integrating electronic business applications across multiple computing platforms, using Java-based Web technologies. The Websphere implementation offers a readily scalable distributed architecture. In such an implementation, there are multiple web servers 23, and each web server communicates with applications running on a number of associated application servers 25.

At a high level, the CCES middleware consists of servers that comprise the web server layer and the application layer. The architecture allows clients 21 to send a request to a global content switch that then sends the request to a web server 23 that will then route the request to an application server 25. The application server 25 then sends the request to a backend system 19. A reply is then sent back to the client 21.

Figure 2:
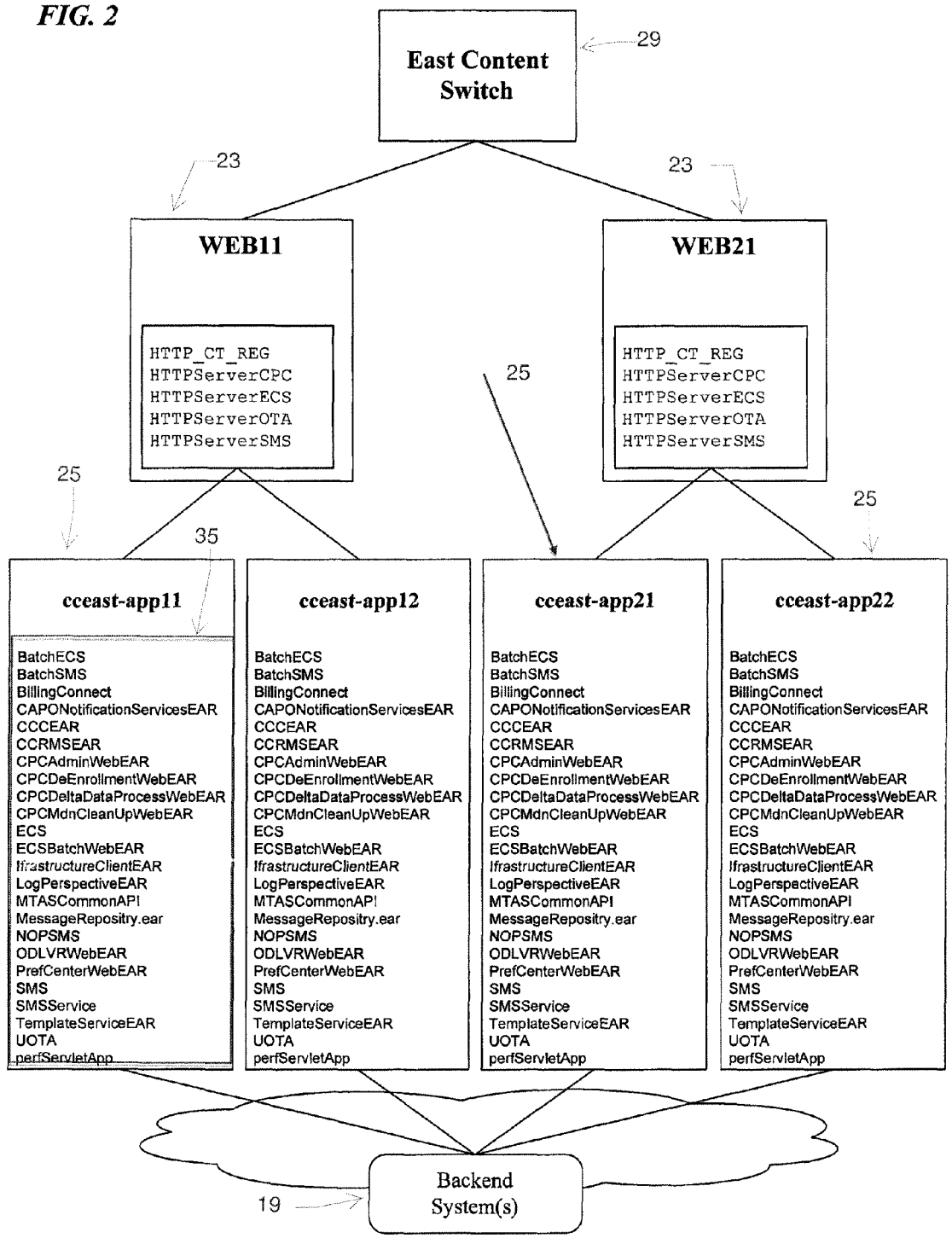
FIG. 2 is a high-level functional block diagram of a portion of the web application server environment, implementing the CCES functions in the system of FIG. 1.

In the illustrated example, there is one global content switch 27 and two regional (one east, one west) content switches 29, 31 to distribute the traffic. The CCES systems in the example include two web servers (WEB11 and WEB21) associated with each regional content switch. For simplicity, the example shows two application servers associated with each web server. A pair of application servers APP 11 and APP 12 is associated with each web server WEB11, and a pair of application servers APP21 and APP22 is associated with each web server WEB21. Those skilled in the art will appreciate that this is a relatively simple example, and that an actual implementation may include more content switches, web servers and application servers. By way of an example, FIG. 2 shows the East elements in somewhat more detail, including the East content switch 29, the East web servers (WEB11 and WEB21) 23 as well as the associated application servers (there referred to as cceast-app11, cceast-app12, cceast-app21, and cceast-app22) 35. Server administrators, maintenance or support personnel have access to the servers 23, 25 via networks (not shown) and appropriate user terminal devices, represented by the exemplary terminal 33.

The CCES middleware structure is setup so that the global content switch 27 accepts a request from a client and routes that request to one of the regional content switches, that is to say in our example, either to the East content switch 29 or the West content switch 31 depending on from which geographic location the request originated. The content switch then forwards the request to one of two different web servers, selected in a round robin fashion to distribute the processing load.

In the example, each UNIX web server has 5 http server instances running on it, although there may be a smaller or larger number of http server instances running on each web server platform. As shown by way of example in FIG. 2, each of the web servers WEB11 and WEB21 runs http servers: HTTP_CT_REG, HTTPServerCPC, HTTPServerECS, HTTPServerOTA and HTTPServerSMS. In the example, the East or West content switch determines which of these 5 http processes within the particular server platform WEB11 or WEB21 to forward the request to, based on the context root of the request.

Upon receipt of a client request, the http server forwards the client request to one of two UNIX application servers, which it selects in a round-robin, static priority, or dynamic priority fashion. Each UNIX application server has multiple applications 35 running on it (see lists in the cceast-app servers in FIG. 2, by way of example). The UNIX application server then determines the proper application to process the request based on the context root of the request.

In the CCES example of FIG. 1, the application server 25 processes the request by sending one or more requests to a backend system 19, such as the Vision Billing System, MTAS, the SMS gateway and others, for example, to implement account activity and to initiate subsequent automatic notification thereof to the account holder for example via SMS to the subscriber's mobile station 13. Once the application server 25 has processed the request, a reply is then sent back to the web server which will then forward the reply back to the client.

In the examples above, the functionality comes from the applications 35 running on the application servers 25. These applications can call on other applications or databases for part of their functionality. The applications also need to be configured pertaining to their output and other parameters. To that end, configuration files are used to store the configurable parameters of the application 35. One example of configuration files are properties files. The properties file's name is based on its file extension, ".properties", and is mainly used in JAVA related technologies. Examples of configurable parameters include server instances, clusters, datasources, calls to the web server, user changeable options, and default values for the application.

Figure 3A:
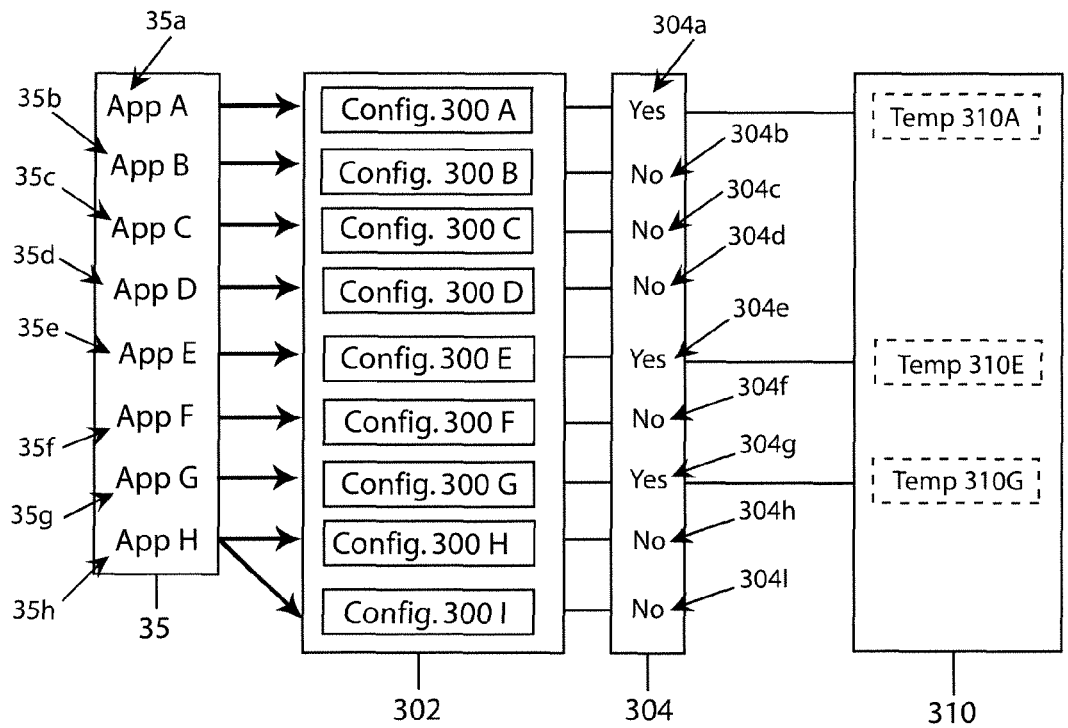
FIG. 3a is a high-level functional block diagram of the generation of a temporary configuration file.

In an example, each application 35 has one or more related configuration files 300 that need to be set. The configuration files 300 are set at the time of the initial creation of the application server 25, when a new application in introduced to the server, or when changes need to be made to the configuration file 300 due to changes anywhere in the system 10. FIG. 3a illustrates the applications 35 (designated A-H) and their related configuration files (300A-300I).

When a dynamic framework generator ("DFG") is initiated, a list 302 of configuration files 300A-300I is provided to the server administrator. The server administrator can select some or all of the configuration files 300A-300I to have the DFG create. Once the selection 304 is made, in the current example as a "yes" or "no", the DFG generates temporary configuration files 310 (in the illustrated example 310A, 310E and 310G).

Figure 3B:
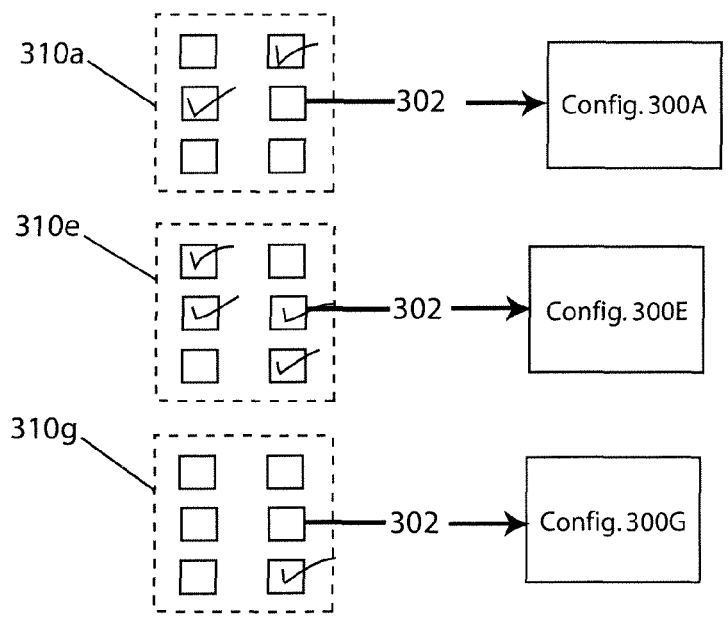
FIG. 3b is a high-level functional block diagram of generating an actual configuration file from the temporary configuration file.

FIG. 3b illustrates the settings 312 in the temporary configuration files 310 are made, either automatically or by the server administrator. The DFG then converts the temporary configuration files 310 into the actual configuration files 300. The actual configuration files are the configuration files 300A, 300E, and 300G used in the example and are used by the applications 35.

Figure 4:
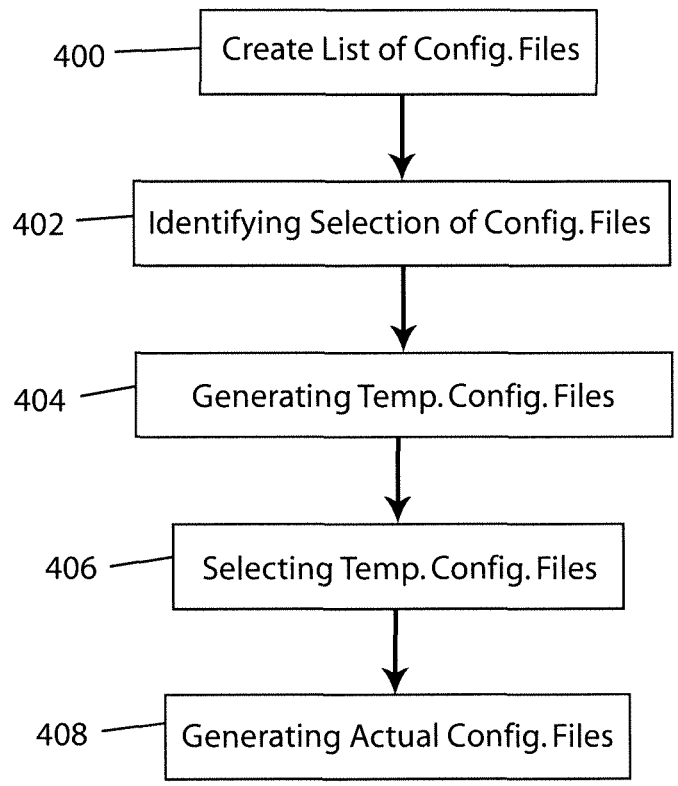
FIG. 4 is a flow chart of an example of a process for generating temporary and actual configuration files.

An example of a method to dynamically create the configuration files is illustrated in FIG. 4. The method for dynamically generating the framework on an application server 25 includes creating the list 302 of the configuration files 300 for the server administrator to choose from (step 400). The server administrator, or a preset software routine, can then identify a selection 304, in the example, "yes/no", of which configuration files 300 are to be generated on the application server 25 (step 402). The DFG then generates the temporary configuration file 310 based on the selection 304 (step 404). The selection and generation above can include one, some, or all configuration files, depending on the condition of the application sever 25.

The settings 312 of the generated temporary configuration file 310 are configured either by the server administrator or by preset software routine (step 406). The settings are used by the application 35 during its operation. The actual configuration file 300 is generated on the application server 25 using the temporary configuration file 310 and the setting 312 (step 408). The temporary configuration files 310 are not necessarily deleted once the configuration files are created 300. The temporary configuration files 310 can be saved in memory and used if this particular application server configuration needs to be replicated, reconfigured or reinstalled.

Figure 5:
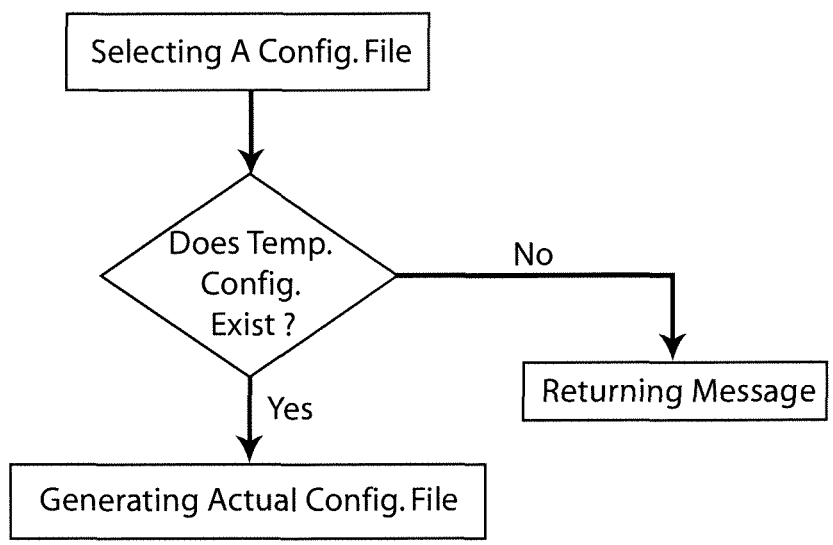
FIG. 5 is a flow chart of an example of a process for generating an actual configuration file from an existing temporary configuration file.
Figure 6:
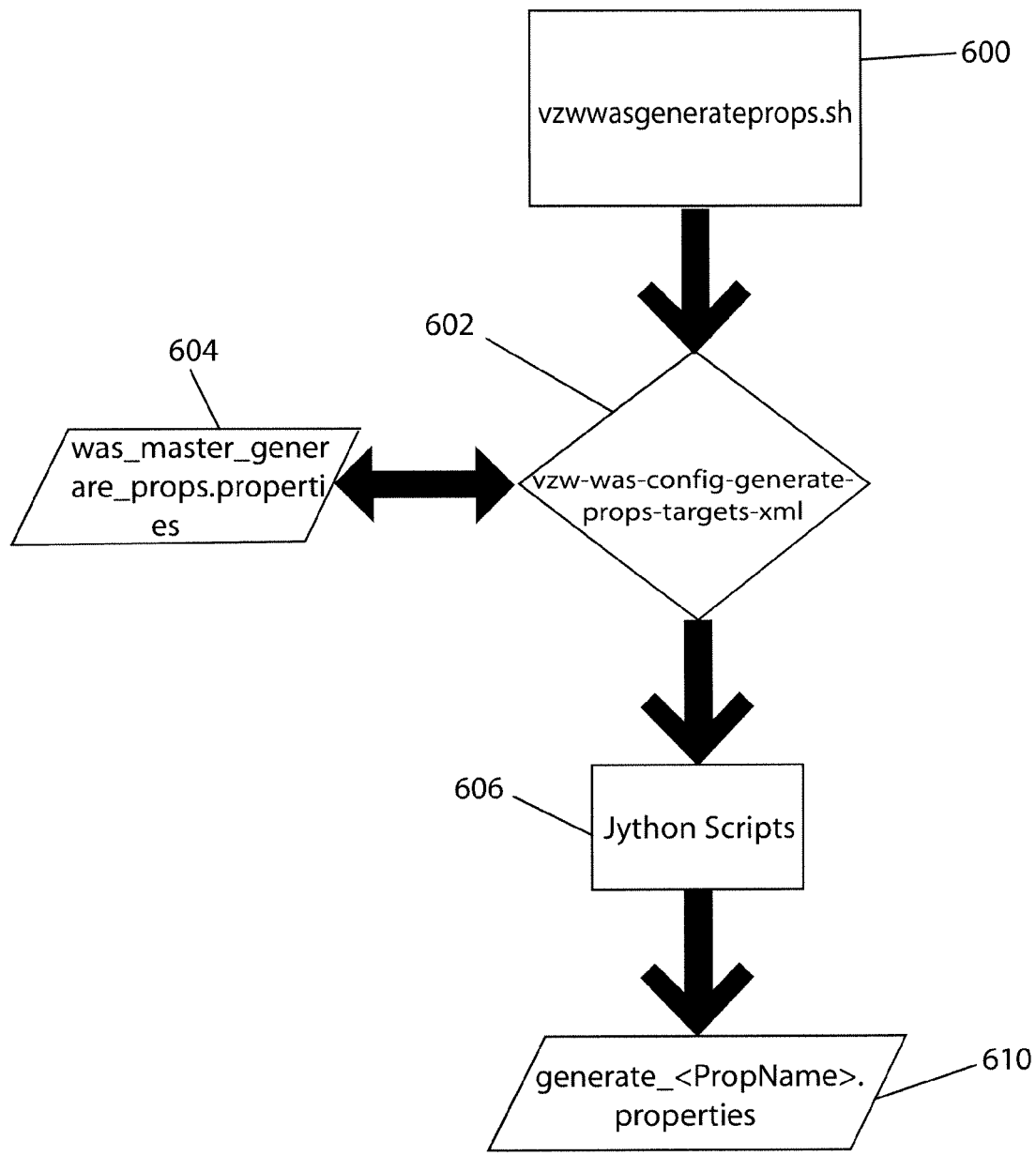
FIG. 6 is a data flow diagram of an example of creating new properties on an application server.

FIG. 5 illustrates the method to replicate, reconfigure, or reinstall a configuration file 300 on the application server 25 with an existing temporary configuration file 310. The method includes selecting a configuration file 300 to reinstall, replicate, or reconfigure on the application server 25 (step 500). The application server 25 can be the same application server that created the temporary configuration file 310 used below, or can be a new application server 25 that needs to be configured. The method can determine if the temporary configuration file 310 exists that is related to the selected configuration file 300 (step 502). The temporary configuration file 310 includes one or more settings 312 for the related application 35. If the temporary configuration file 310 exists, the actual configuration file 300 is generated using the temporary configuration file 310 and the setting 312 (step 504). If the temporary configuration file 310 does not exist, a message is returned (step 506). The message in this example can be any indication that the temporary configuration file 310 does not exist. The message can include, presenting a notification or error message to the server administrator, returning to a previous menu, freezing the routine or terminating the routine.

Turning to FIGS. 6-9, these figures illustrate the data flows of yet another example. In this example, the DFG creates multiple application servers 25 at one time using ".property" files. This example allows an entire WAS, IHS, and Application Server to be built rapidly. There are two main parts to this example. The first part is to generate the property files 300 and second to configure them.

In this example, since we are creating a brand new WAS, IHS, and/or Application Server the generate portion involves the initial creation of the property files such as: appserver, authorizationgroup, cluster, clustermember, ear, j2cauthdata, jdbcprovider, mbdlistener, qconnectionfactory, qdestination, and wasvariable. In this example, the file vzwwasgenerateprosps.sh 600 can call the routines:

create.appserver.instance—creates an appserver/(single server) instance in WAS create.cluster—creates a cluster in WAS create.wasvariable—creates a WebSphere variable for a Java Virtual Machine ("JVM")

create.clustermember—creates cluster member's in WAS create.jdbcprovider—creates jdbc provider in WAS create.j2cauthdata—creates a JAAS/J2C Authentication Alias in WAS create.datasource—create a datasource in WAS create.qconnectionfactory—creates a wmq connection factory in WAS create.qdestination—creates a queue type destination for the WebSphere MQ in WAS create.mdblistener—creates a message/(mdb) listener service in WAS create.deploy.ear—script to deploy the EAR in WAS set.genericJvmArguments—script to set the genericJvmArguments on JVMs create.customservice—creates a custom service in WAS When executing the vzwwasgenerateprops.sh file 600 it then calls a vzw-was-config-generate-props-targets.xml 602 routine. The vzw-was-config-generate-props-targets.xml reads a was_master_generate_props.properties file 604 to check which property file(s) should be generated. Inside the was_master_generate_props.properties file 604 an example of the statements that appear are:

wasconfig.generate.nodelist.properties=No
wasconfig.generate.cluster.properties=Yes
wasconfig.generate.clustermember.properties=Yes
wasconfig.generate.jdbcprovider.properties=Yes
wasconfig.generate.datasource.properties=Yes
wasconfig.generate.qconnectionfactory.properties=No
wasconfig.generate.qdestination.properties=No The statement "wasconfig.generate.nodelist.properties=No" instructes vzw-was-config-generate-props-targets.xml not to execute a particular Jython script 606 (generate_nodelist.py). If the statement was equal to "Yes" (i.e. "wasconfig.generate.nodelist.properties=Yes"), this instructs vzw-was-config-generate-props-targets.xml to execute the particular Jython script 606 (i.e.generate_nodelist.py). Jython is one of two scripting languages used in the WAS. The Jython script "generate_nodelist.py" generates the file generate_nodelist.properties 608. In other words, the Jython scripts are generating the temporary properties files 610. The more "wasconfig.generate" files set to "Yes" the more Jython scripts are called to create the temporary properties files 610. Thus, if multiple properties are set in was_master_generate_props.properties file, multiple Jython scripts are executed.

Figure 7:
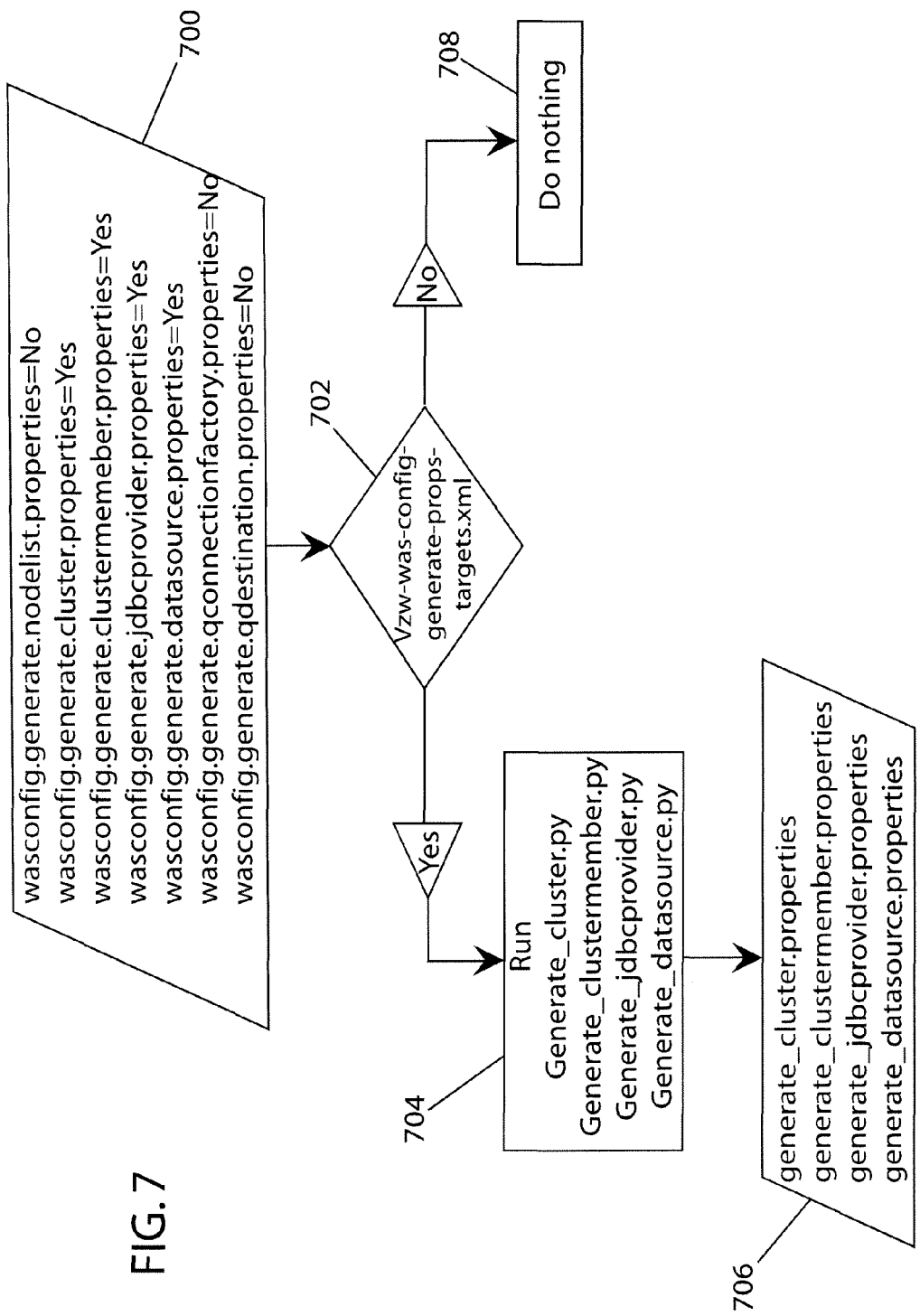
FIG. 7 is a flow chart of an example of creating new properties on an application server.

FIG. 7 illustrates a method regarding the above data flow. Step 700 sets the statements in the was_master_generate_props.properties file 604. Step 702 executes vzw-was-config-generate-props-targets.xml and determines the status of each "wasconfig.generate" call. For each "yes" in the was_master_generateprops.properties file 604, the related Jython script is called and run (step 704). At the completion of the Jython script run, the script generates the temporary property file (step 706). For each "no" in the was_master_generate_props.properties file 604, the related Jython script is not called (step 708). Thus, if multiple properties are set in the was_master_config.properties file, multiple Jython scripts are executed.

Figure 8:
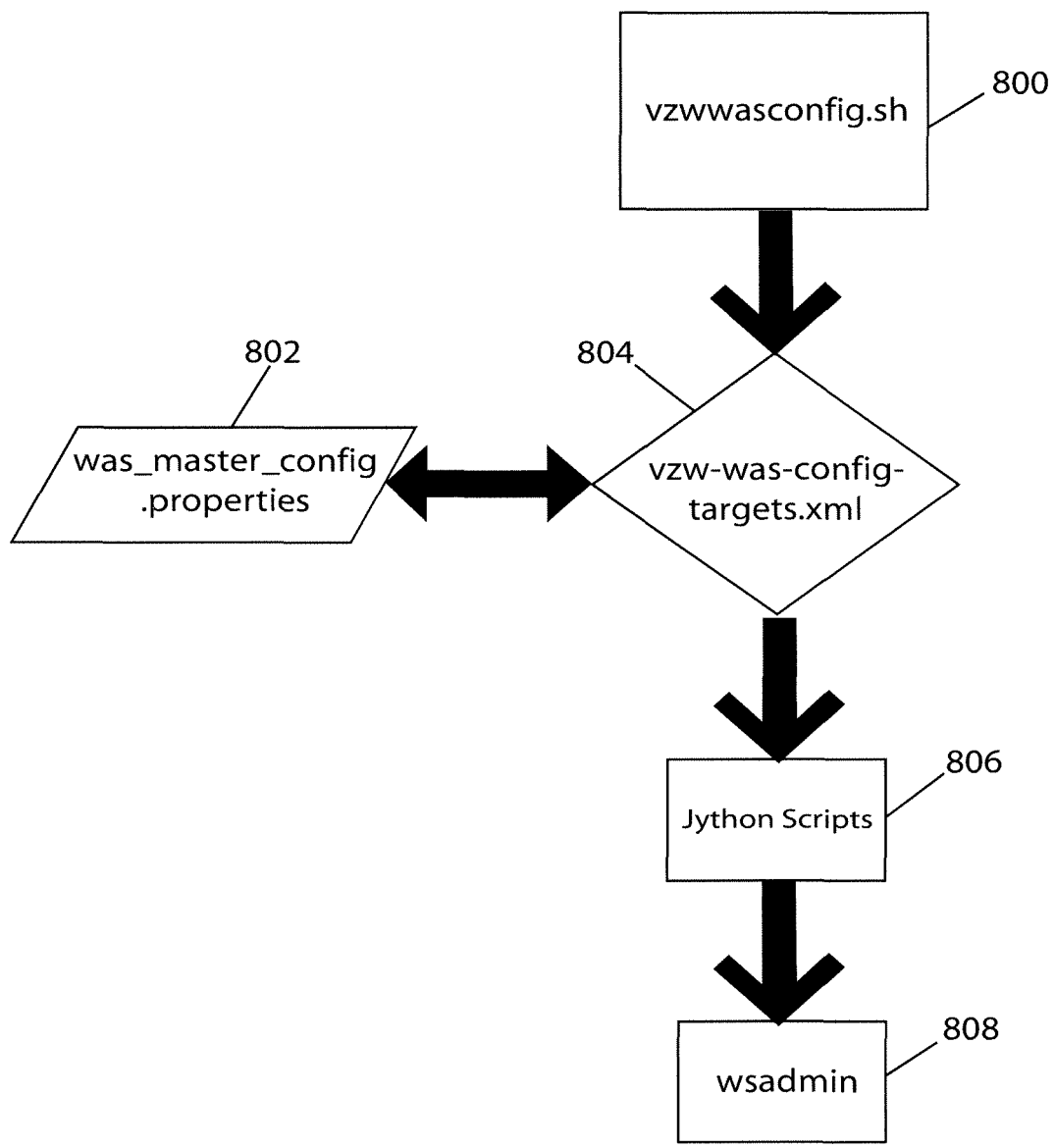
FIG. 8 is a data flow diagram of an example of updating the properties on an application server.

The second part of creating an application server is configuring it using vzwwasconfig.sh 800, as illustrated in FIG. 8. The newly created temporary properties files (i.e. "generate_<PropName>.properties") are configured to the desired settings and renamed (in the example, to "create_<PropName>.properties"). A was_master_config.properties file 802 is configured to set flags to call the corresponding renamed temporary properties files (i.e. "create_<PropName>.properties).

Once vzwwasconfig.sh 800 is run, the script calls a second script, vzw-was-config-targets.xml 804. The vzw-was-config-targets.xml 804 reads in the was_master_config.properties file 802 to check which flags are set. From the flags, the appropriate Jython create script 806 is run. The Jython script invokes and passes values to the wsadmin tool 808 provided with WebSphere to configure the application server 25.

Figure 9:
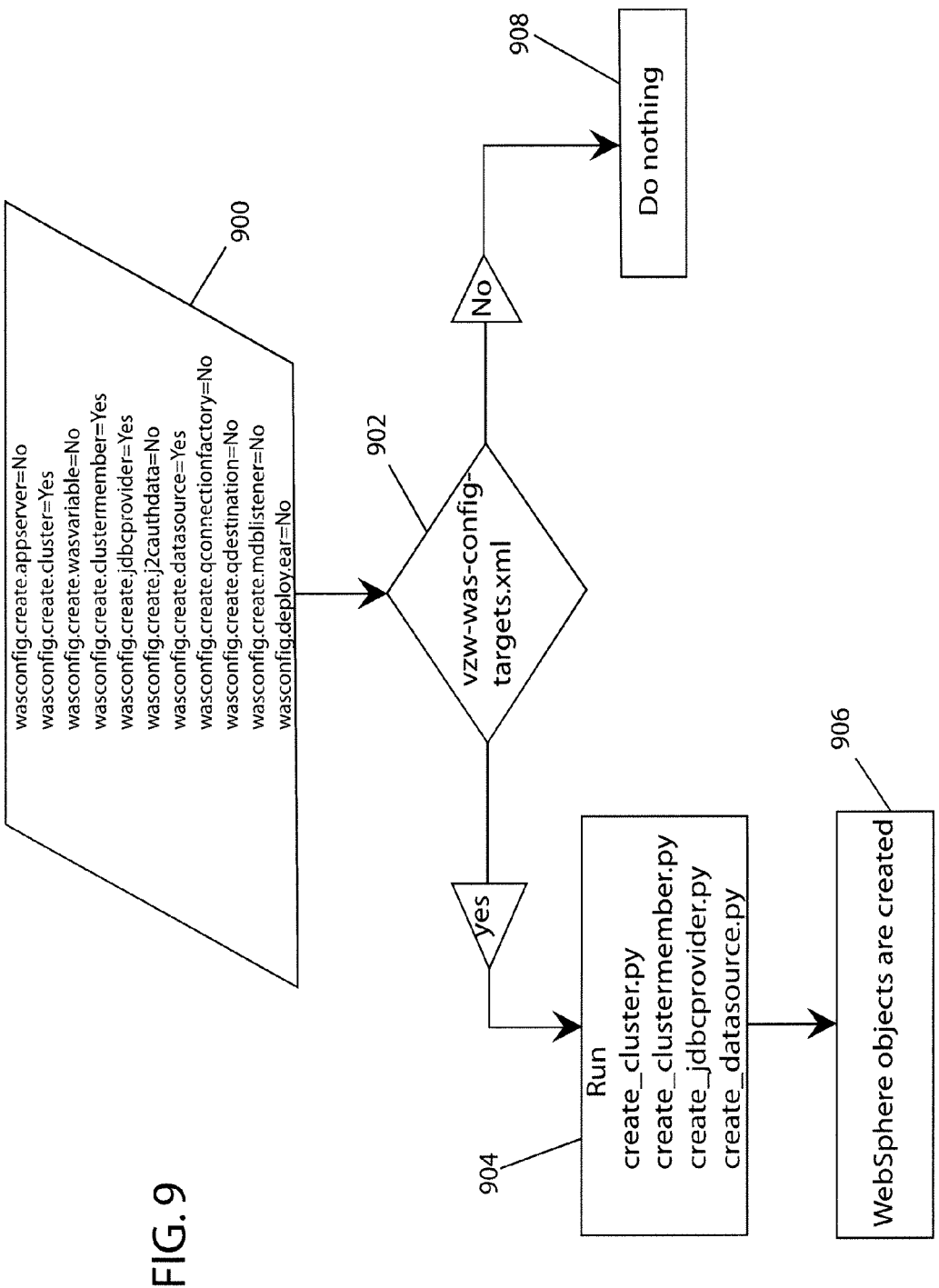
FIG. 9 is a flow chart of an example of updating the properties on an application server.

The configuration method is illustrated in FIG. 9. One step is configuring the was_master_config.properties file 802 to set flags to call the corresponding renamed temporary properties files (i.e. "create_<PropName>.properties) (step 900). Step 902 calls the file vzw-was-config-targets.xml 804 to read the was_master_config.properties file 802 to check which flags are set for each of the "wasconfig.create" files. In this example, the flags are set to either "yes" or "no". For each flag set to "yes" the appropriate Jython create script 806 is run (step 904). The Jython create script creates the .properties files and creates the WebSphere objects (step 906). For each "no" in the was_master_config.properties file 802, the related Jython script is not called (step 908).

Below is Table 1 with a summary of the files and their functions, as described above in more detail.

ports for communication purposes. The software functionalities involve programming, including executable code for the dynamic framework generator programming as well as associated stored data, e.g. for the DFG. The software code is executable by the general-purpose computer that functions as

TABLE 1

| Filename | Purpose |
|---|---|
| vzwwasgenerateprops.sh | This is the main generating script. The script, as explained above, ties in the generate xml, properties, and Jython scripts for an end result to create the generate_<PropName>.properties file(s). |
| vzwwasconfig.sh | This is the main deployment script that ties in the create xml, properties, and Jython scripts for an end result to create a WebSphere Application Server application. |
| vzw-was-config-generate-props-targets.xml | This xml file reads the values in the was_master_generate_props.properties file then invokes the corresponding generate Jython script. |
| vzw-was-config-targets.xml | This xml file reads the values in the was_master_config.properties then invokes the corresponding create Jython script. |
| was_master_generate_props.properties | Flags are set to Yes or No. This .properties file works in conjunction with vzw-was-config-generate-props-targets.xml. Depending on which flags are set in the .properties file the xml file will execute the corresponding generate Jython script. The end result is a .properties file. Examples from was_master_generate_props.properties:<br>    wasconfig.generate.nodelist.properties=No<br>    wasconfig.generate.cluster.properties=Yes<br>    wasconfig.generate.clustermember.properties=Yes<br>    wasconfig.generate.jdbcprovider.properties=Yes<br>    wasconfig.generate.datasource.properties=Yes<br>    wasconfig.generate.qconnectionfactory.properties=No<br>    wasconfig.generate.qdestination.properties=No |
| was_master_config.properties | Flags are set to Yes or No. This .properties file works in conjunction with vzw-was-config-targets.xml. Depending on the flags set in this .properties file the xml file executes the corresponding create Jython script. The end result is a new WebSphere Application Server application.<br>Example from was_master_config.properties:<br>    wasconfig.create.appserver=No<br>    wasconfig.create.cluster=No<br>    wasconfig.create.wasvariable=No<br>    wasconfig.create.clustermember=No<br>    wasconfig.create.jdbcprovider=No<br>    wasconfig.create.j2cauthdata=No<br>    wasconfig.create.datasource=No<br>    wasconfig.create.qconnectionfactory=Yes<br>    wasconfig.create.qdestination=No<br>    wasconfig.create.mdblistener=No<br>    wasconfig.deploy.ear=No |
| Generate Jython Scripts | generate_cluster.py<br>generate_clustermember.py<br>generate_datasource.py<br>generate_jdbcprovider.py<br>generate_nodelist.py<br>generate_qconnectionfactory.py<br>generate_qdestination.py |
| Create Jython Scripts | The create Jython scripts use wasadmin.sh to perform configuration.<br>create_appserver.py<br>create_authorizationgroup.py<br>create_cluster.py<br>create_clustermember.py<br>create_datasource.py<br>deploy_ear.py<br>create_j2cauthdata.py<br>create_jdbcprovider.py<br>create_mdblistener.py<br>create_qconnectionfactory.py<br>create_qdestination.py<br>create_wasvariable.py |
| wasadmin.sh | Jython scripts will invoke this IBM script to perform WebSphere Application Server administrative tasks. |

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or the web server, application server(s) and/or that functions as a technician's terminal device. In operation, the code is stored within the general-purpose computer platform. At other times, however, the software may be stored at other locations and/or transported for loading into the appropriate general-purpose computer system. Execution of such code by a processor of the computer platform enables the platform to implement the methodology to create or reconfigure configuration files for the application server, in essentially the manner performed in the implementations discussed and illustrated herein.

Figure 10:
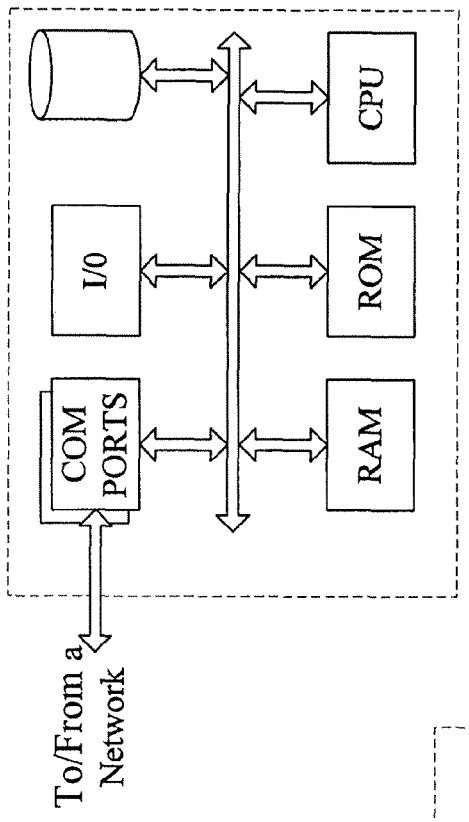
FIG. 10 is a simplified functional block diagram of a computer that may be configured as a host or server, for example, to function as any of the web or application servers in the system of FIG. 1.
Figure 11:
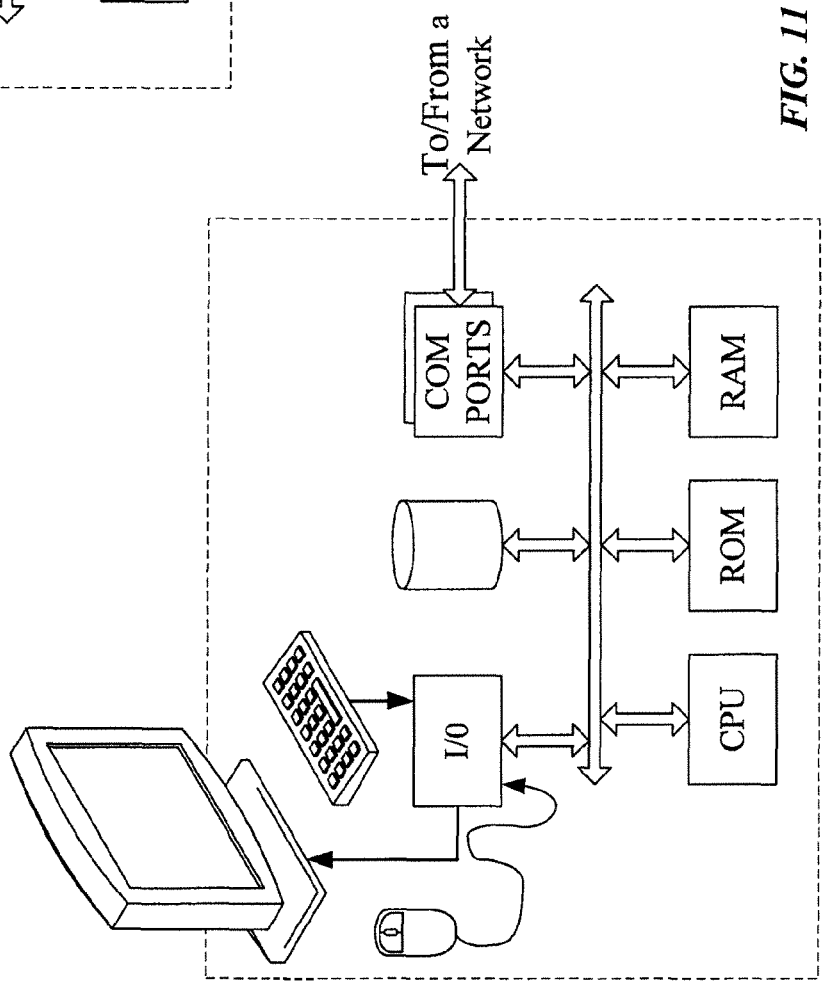
FIG. 11 is a simplified functional block diagram of a personal computer or other work station or terminal device, such as that for a server administrator to configure properties of an application server.

FIGS. 10 and 11 provide functional block diagram illustrations of general purpose computer hardware platforms. FIG. 10 illustrates a network or host computer platform, as may typically be used to implement a server. FIG. 11 depicts a computer with user interface elements, as may be used to implement a personal computer or other type of work station or terminal device, although the computer of FIG. 11 may also act as a server if appropriately programmed. It is believed that those skilled in the art are familiar with the structure, programming and general operation of such computer equipment and as a result the drawings should be self-explanatory.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers and terminal device computers are conventional in nature, and it is presumed that those skilled in the art are adequately familiar therewith. Of course, the server functions may be implemented in a distributed fashion on a number of similar platforms, to distribute the processing load Hence, aspects of the methods of generating or updating configuration files, as outlined above, may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the network operator into the computer platform of a web server and platforms of the associated application servers that will implement the DFG. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible, non-transitory "storage" media, terms such as computer or machine "readable medium" refer to any medium that participates in providing instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

APPENDIX

Acronym List

The description above has used a large number of acronyms to refer to various services, messages and system components. Although generally known, use of several of these acronyms is not strictly standardized in the art. For the convenience of the reader, the following list correlates terms to acronyms, as used by way of example in the detailed description above.

CCES—Customer Care Enterprise System (CCES) is an infrastructure that supports a number of applications.

CSS—The Content Services Switch offers new levels of performance, resource management, network connectivity, system and session reliability, integrated SSL acceleration, and robust load balancing functionality within a compact, modular chassis.

WebSphere® Application Server (WAS app server/web server)—IBM WebSphere Application Server (WAS), a software application server, is the flagship product within IBM's WebSphere brand. WAS is built using open standards such as Java EE, XML, and Web Services.

IBM HTTP Server (IHS)—IBM HTTP Server is based on the Apache HTTP Server (httpd.apache.org), developed by the Apache Software Foundation.

What is claimed is:

1. A method, comprising the steps of:
    on a computer of an application server, creating a list of a plurality of configuration files corresponding to a plurality of applications running on the application server;
    on the computer of the application server, receiving a selection of at least one configuration file from the list of the plurality of configuration files to be modified on the application server;
    on the computer of the application server, generating a temporary configuration file corresponding to each selected configuration file;
    for each temporary configuration file, receiving a respective configuration of a setting of the temporary configuration file; and
    generating, on the computer of the application server, an actual configuration file corresponding to each temporary configuration file and respective received configuration, wherein:
    each actual configuration file replaces each corresponding selected configuration file;
    each actual configuration file is accessed by a corresponding application of the plurality of applications running on the application server; and
    each temporary configuration file is deleted or maintained in memory distinct from each corresponding actual configuration file.

2. The method of claim 1, wherein the creating step creates the list in a master property generation file.

3. The method of claim 1, wherein each temporary configuration file is a temporary properties file and each actual configuration file is an actual properties file.

4. The method of claim 1, wherein the generating the temporary configuration file step is performed using a Jython script.

5. The method of claim 1, wherein the application server is a Websphere Application Server (WAS).

6. The method of claim 1, wherein each respective received setting is at least one of server instances, clusters, datasources, calls to the web server, user changeable options, or default values for the application.

7. An article of manufacture, comprising:
    at least one non-transitory machine readable storage medium; and
    programming instructions embodied in said at least one medium for execution by one or more computers, wherein the programming configures said one or more computers to be capable of performing functions, the functions comprising:
    creating a list of a plurality of configuration files corresponding to a plurality of applications running on an application server;
    receiving a selection of at least one configuration file from the list of the plurality of configuration files to be modified on the application server;
    generating a temporary configuration file corresponding to each selected configuration file;
    for each temporary configuration file, receiving a respective configuration of a setting of the temporary configuration file; and
    generating, on the computer of the application server, an actual configuration file corresponding to each temporary configuration file and respective received configuration, wherein:
    each actual configuration file replaces each corresponding selected configuration file;
    each actual configuration file is accessed by a corresponding application of the plurality of applications running on the application server; and
    each temporary configuration file is deleted or maintained in memory distinct from each corresponding actual configuration file.

8. The article of claim 7, wherein the list is created in a master property generation file.

9. The article of claim 7, wherein the temporary configuration file is a temporary properties file and the actual configuration file is an actual properties file.

10. The article of claim 7, wherein the generating the temporary configuration file step is performed using a Jython script.

11. The article of claim 7, wherein the application server is a Websphere Application Server (WAS).

12. The article of claim 7, wherein each respective received setting is at least one of server instances, clusters, datasources, calls to the web server, user changeable options, or default values for the application.

13. A method, comprising the steps of:
    on a computer of an application server, receiving a selection of a configuration file corresponding to an application on the application server to at least one of reinstall, replicate, or reconfigure the application on the application server;
    on the computer of the application server, determining if a temporary configuration file exists corresponding to the selected configuration file, wherein the temporary configuration file includes a setting;
    on the computer of the application server, if the temporary configuration file exists, generating an actual configuration file corresponding to the temporary configuration file and the setting; and
    replacing the selected configuration file with the actual configuration file, wherein
    the actual configuration file is accessed by the corresponding application running on the application server.

14. The method of claim 13, further comprising the step of generating a new temporary configuration file corresponding to a second selected configuration file on a second application server if there is no existing temporary configuration file corresponding to the second selected configuration file.

15. The method of claim 13, wherein the generating the actual configuration file step is performed using a Jython script.

16. The method of claim 13, wherein the application server is a Websphere Application Server (WAS).

17. The method of claim 13, wherein the setting is at least one of server instances, clusters, datasources, calls to the web server, user changeable options, or default values for the application.

18. An article of manufacture, comprising:
- at least one non-transitory machine readable storage medium; and
- programming instructions embodied in said at least one medium for execution by one or more computers, wherein the programming configures said one or more computers to be capable of performing functions, the functions comprising:
- receiving a selection of a configuration file corresponding to an application on an application server to at least one of reinstall, replicate, and reconfigure the application on the application server;
- determining if a temporary configuration file exists corresponding to the selected configuration file, wherein the temporary configuration file includes a setting;
- if the temporary configuration file exists, generating an actual configuration file corresponding to the temporary configuration file and the setting; and
- replacing the selected configuration file with the actual configuration file, wherein
- the actual configuration file is accessed by the corresponding application running on the application server.

19. The article of claim 18, wherein the programming comprises generating a new temporary configuration file corresponding to a second selected configuration file on a second application server if there is no existing temporary configuration file corresponding to the second selected configuration file.

20. The article of claim 18, wherein the generating the actual configuration file step is performed using a Jython script.

21. The article of claim 18, wherein the application server is a Websphere Application Server (WAS).

22. The article of claim 18, wherein the setting is at least one of server instances, clusters, datasources, calls to the web server, user changeable options, or default values for the application.

* * * * *